US012525388B2

(12) United States Patent
Hwang et al.

(10) Patent No.: US 12,525,388 B2
(45) Date of Patent: Jan. 13, 2026

(54) COIL COMPONENT

(71) Applicant: SAMSUNG ELECTRO-MECHANICS CO., LTD., Suwon-si (KR)

(72) Inventors: Ji Hoon Hwang, Suwon-si (KR); Myoung Ki Shin, Suwon-si (KR); Jeong Gu Yeo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 18/416,421

(22) Filed: Jan. 18, 2024

(65) Prior Publication Data

US 2024/0161971 A1 May 16, 2024

Related U.S. Application Data

(63) Continuation of application No. 17/215,860, filed on Mar. 29, 2021, now Pat. No. 12,176,138.

(30) Foreign Application Priority Data

Dec. 30, 2020 (KR) ........................ 10-2020-0187196

(51) Int. Cl.
*H01F 27/29* (2006.01)
*H01F 17/00* (2006.01)
(Continued)

(52) U.S. Cl.
CPC ........ *H01F 27/292* (2013.01); *H01F 17/0013* (2013.01); *H01F 17/04* (2013.01); *H01F 27/324* (2013.01); *H01F 2017/048* (2013.01)

(58) Field of Classification Search
CPC .... H01F 27/292; H01F 17/0013; H01F 17/04; H01F 27/324; H01F 2017/048;
(Continued)

(56) References Cited

U.S. PATENT DOCUMENTS

2016/0086719 A1 3/2016 Jeong
2019/0333679 A1 10/2019 Lee et al.
2021/0090784 A1 3/2021 Kim et al.

FOREIGN PATENT DOCUMENTS

JP 2009-76719 A 4/2009
JP 2013-098378 A 5/2013
(Continued)

OTHER PUBLICATIONS

Office Action issued Jun. 4, 2024 for U.S. Appl. No. 17/215,860.
(Continued)

*Primary Examiner* — Tuyen T Nguyen
(74) *Attorney, Agent, or Firm* — Morgan Lewis & Bockius LLP

(57) ABSTRACT

A coil component includes a body having a first surface and including first and second recessed-cutout portions spaced apart from each other on the first surface of the body, a support substrate, a coil unit disposed on the support substrate to be perpendicularly to the first surface of the body, and first and second external electrodes spaced apart from each other on the first surface of the body and connected to first and second lead patterns of the coil unit, respectively. The first and second external electrodes include conductive resin layers filling the first and second recessed-cutout portions to be in contact with the first and second lead patterns, each of the conductive resin layers having a first surface exposed to the first surface of the body, and the first and second external electrodes further include electrode layers disposed on the first surfaces of the conductive resin layers.

21 Claims, 10 Drawing Sheets

(51) Int. Cl.
*H01F 17/04* (2006.01)
*H01F 27/32* (2006.01)

(58) Field of Classification Search
CPC . H01F 5/04; H01F 27/28; H01F 27/29; H01F 27/306; H01F 27/02; H01F 27/2804
See application file for complete search history.

(56) References Cited

FOREIGN PATENT DOCUMENTS

| | | | | |
|---|---|---|---|---|
| JP | 2019-161170 | A | | 9/2019 |
| KR | 10-1652850 | B1 | * | 8/2016 |
| KR | 10-2018-0012178 | A | | 2/2018 |
| KR | 10-2019-0123849 | A | | 11/2019 |
| KR | 10-2191248 | B1 | | 12/2020 |

OTHER PUBLICATIONS

Office Action dated May 12, 2025, issued in corresponding Korean Patent Application No. 10-2020-0187196, with an English translation.

* cited by examiner

'C'

COIL COMPONENT

CROSS-REFERENCE TO RELATED APPLICATION

The present application is a continuation patent application of U.S. patent application Ser. No. 17/215,860, filed on Mar. 29, 2021, which claims the benefit of priority to Korean Patent Application No. 10-2020-0187196, filed on Dec. 30, 2020, the disclosures of which is incorporated herein by reference in their entireties.

TECHNICAL FIELD

The present disclosure relates to a coil component.

BACKGROUND

An inductor, one of the coil components, is a typical passive electronic component used in electronic devices along with a resistor and a capacitor.

As electronic devices have increasingly high performance and are made compact, electronic components used in electronic devices increase in number and are miniaturized.

In the case of a thin film type coil component, a magnetic composite sheet in which magnetic metal powder particles are dispersed in an insulating resin is laminated and cured on a substrate on which a coil unit is formed by plating to form a body, and external electrodes are formed on a surface of the body.

Meanwhile, among coil components is provided a vertical coil component in which a coil in the component is disposed perpendicularly to a mounting surface of the component in order to minimize a mounting area of the coil component on a mounting board such as a printed circuit board (PCB) or the like.

SUMMARY

An aspect of the present disclosure may provide a coil component in which connection reliability between a coil unit and external electrodes is improved.

According to an aspect of the present disclosure, a coil component includes: a body having a first surface and including first and second recessed-cutout portions spaced apart from each other on the first surface of the body; a support substrate disposed in the body; a coil unit disposed on the support substrate and disposed to be perpendicularly to the first surface of the body; and first and second external electrodes disposed to be spaced apart from each other on the first surface of the body and connected to first and second lead patterns of the coil unit, respectively, wherein the first and second external electrodes include conductive resin layers respectively filling the first and second recessed-cutout portions to be in contact with the first and second lead patterns exposed to the first and second recessed-cutout portions, each of the conductive resin layers having a first surface exposed to the first surface of the body, and the first and second external electrodes further include electrode layers disposed on the first surfaces of the conductive resin layers.

According to another aspect of the present disclosure, a coil component includes: a body having a first surface and including first and second recessed-cutout portions spaced apart from each other on the first surface of the body; a coil unit disposed in the body and perpendicularly to the first surface of the body and including first and second lead patterns exposed to inner surfaces of the first and second recessed-cutout portions, respectively; and first and second external electrodes spaced apart from each other on the first surface of the body and connected to the first and second lead patterns, respectively, wherein the first and second external electrodes each includes a conductive resin layer including a base resin and a conductive connection portion disposed in the base resin and connected to the first and second lead patterns respectively exposed to the first and second recessed-cutout portions.

According to still another aspect of the present disclosure, a coil component includes: a body: a coil unit disposed in the body and perpendicularly to a first surface of the body and including first and second lead patterns; first and second external electrodes, at least partially embedded in the body, spaced apart from each other on the first surface of the body, wherein each of the first and second external electrodes includes a conductive resin layer, partially embedded in the body to be connected to the first or second lead pattern, and an electrode layer disposed on a first surface of the conductive resin layer exposed to the first surface of the body.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Various types of electronic components are used in electronic devices, and various types of coil components may be appropriately used between the electronic components for the purpose of removing noise.

That is, in an electronic device, a coil component may be used as a power inductor, a high frequency (HF) inductor, a general bead, a high frequency bead (GHz bead), a common mode filter, and the like.

Figure 1:
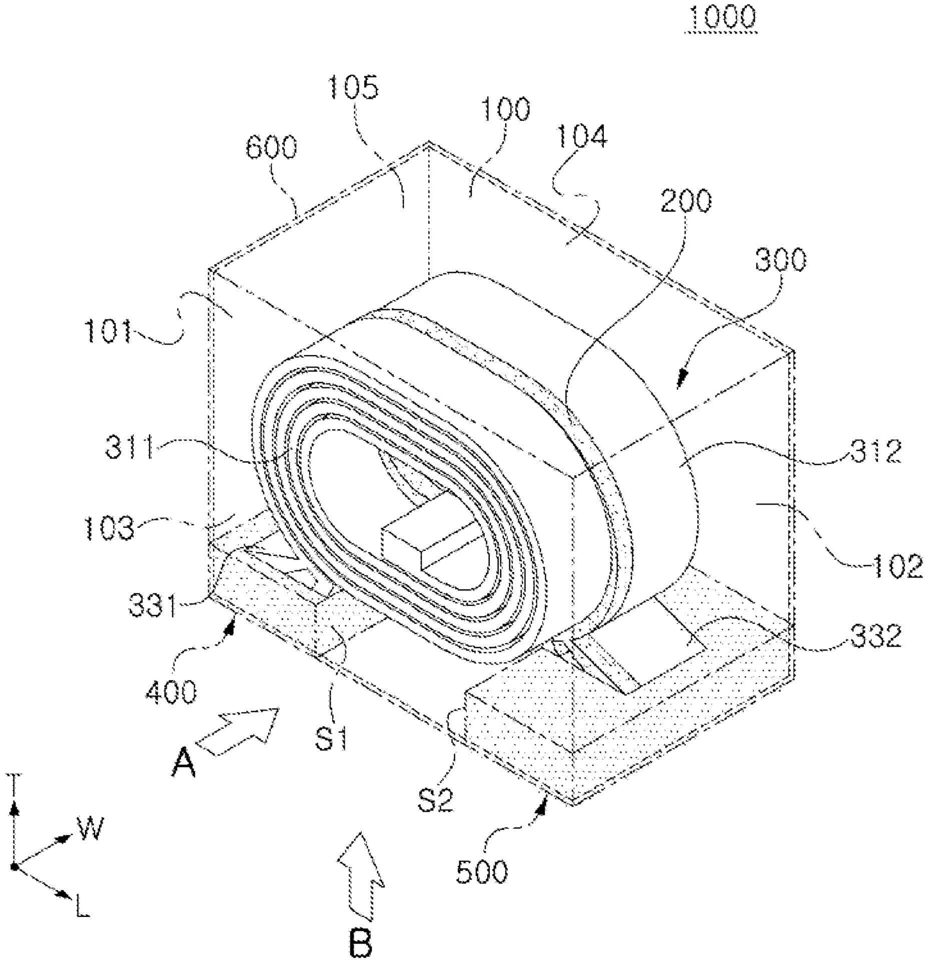
FIG. 1 is a view schematically illustrating a coil component according to an exemplary embodiment in the present disclosure.
Figure 2:
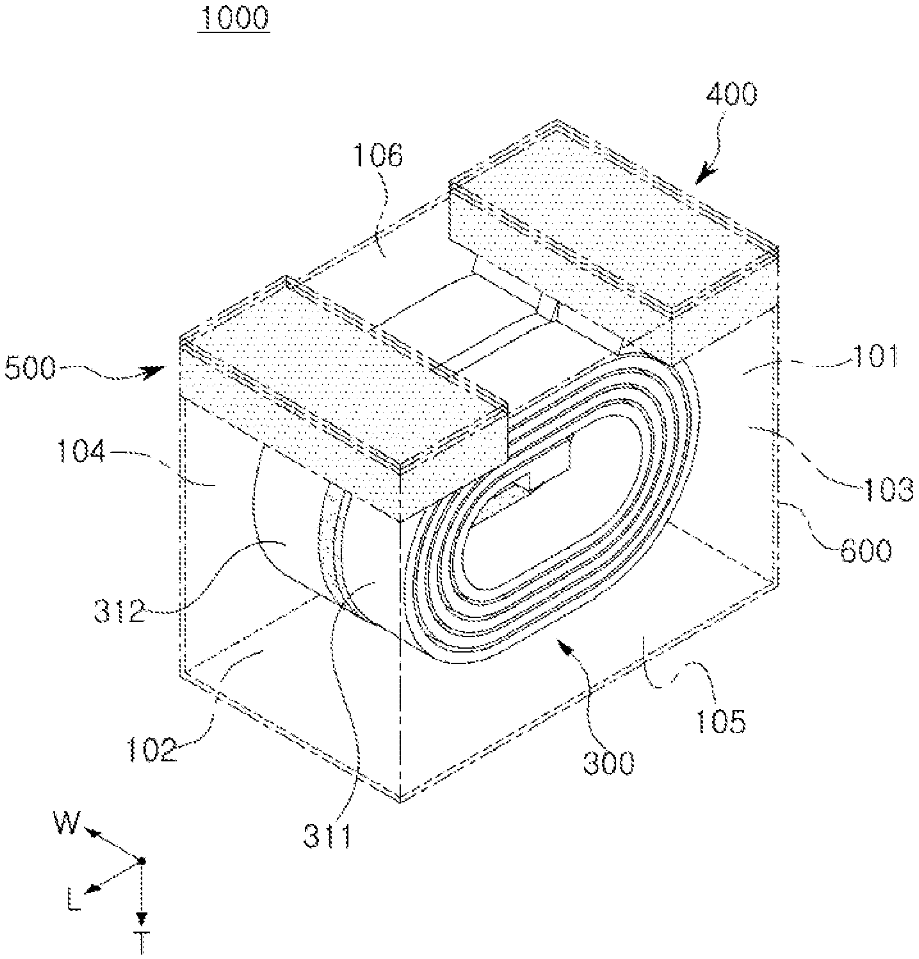
FIG. 2 is a bottom view schematically illustrating a coil component according to an exemplary embodiment in the present disclosure.
Figure 3:
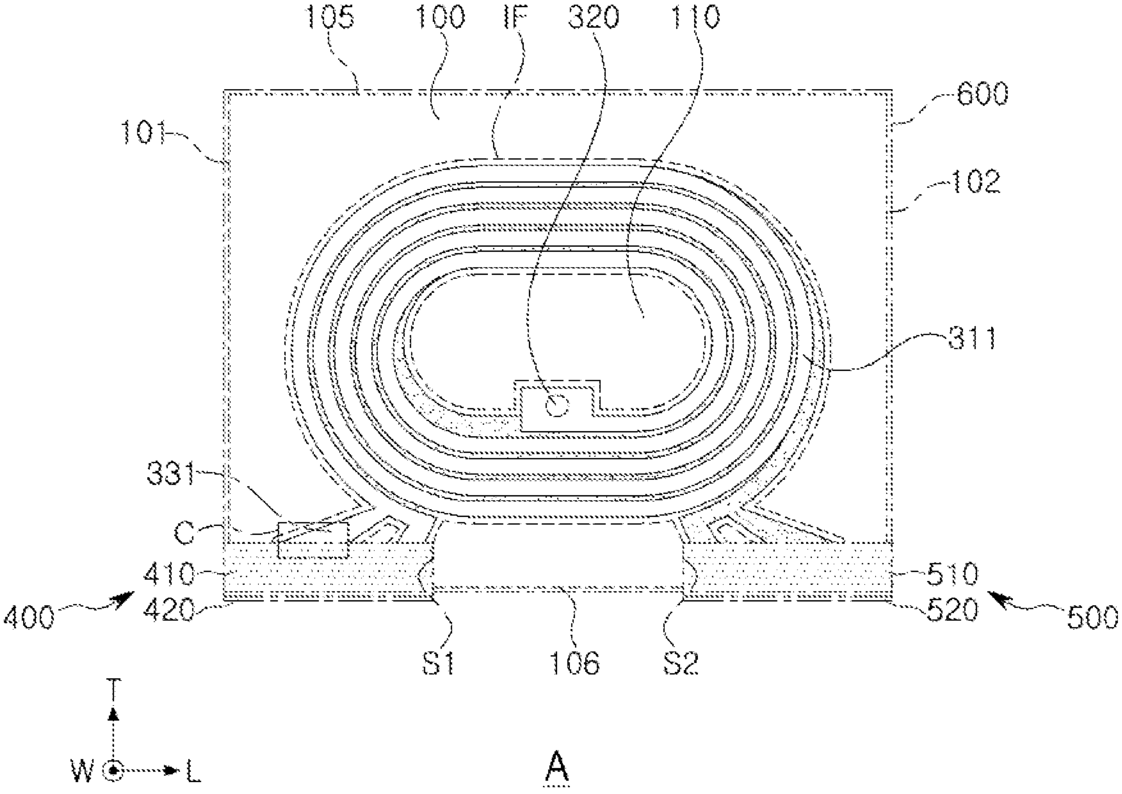
FIG. 3 is a view schematically illustrating a coil component viewed in a direction A of FIG. 1.
Figure 4:
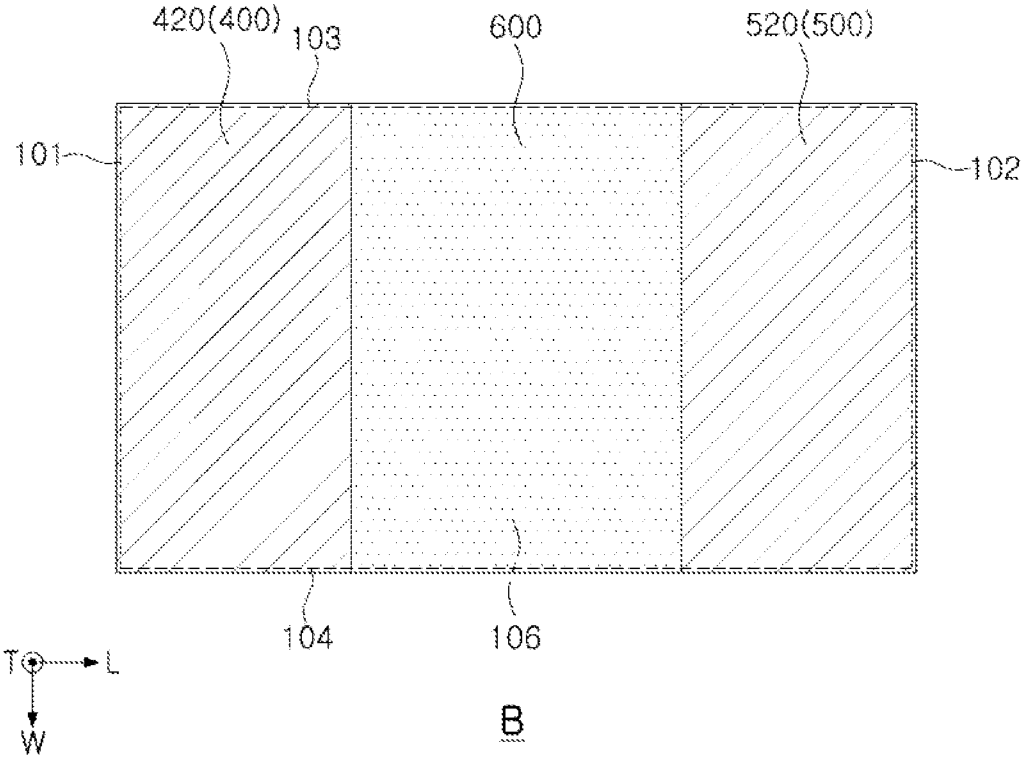
FIG. 4 is a view schematically illustrating a coil component viewed in a direction B of FIG. 1.
Figure 5:
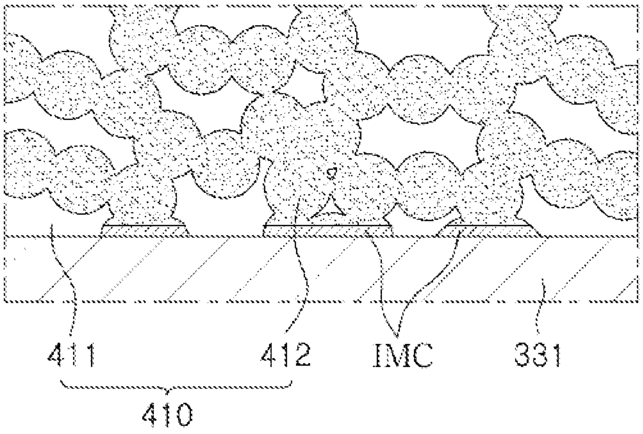
FIG. 5 is an enlarged view of C of FIG. 3.

FIG. 1 is a view schematically illustrating a coil component according to an exemplary embodiment in the present disclosure. FIG. 2 is a bottom view schematically illustrating a coil component according to an exemplary embodiment in the present disclosure. FIG. 3 is a view schematically illustrating a coil component viewed in a direction A of FIG. 1. FIG. 4 is a view schematically illustrating a coil component viewed in a direction B of FIG. 1. FIG. 5 is an enlarged view of C of FIG. 3. Meanwhile, FIG. 3 shows a coil component viewed in the direction A of FIG. 1, illustrating a projected internal structure of the coil component according to an exemplary embodiment of the present disclosure.

Referring to FIGS. 1 through 5, a coil component 1000 according to an exemplary embodiment in the present disclosure includes a body 100, a support substrate 200, a coil unit 300, recessed-cutout portions S1 and S2, and external electrodes 400 and 500, and may further include a surface insulating layer 600.

The body 100 forms the exterior of the coil component 1000 according to this exemplary embodiment, and the coil unit 300 is embedded in the body 100.

The body 100 may be formed in the shape of a hexahedron as a whole.

In FIGS. 1 through 3, the body 100 includes a first surface 101 and a second surface 102 facing each other in a length direction L, a third surface 103 and a fourth surface 104 facing each other in the width direction W, and a fifth surface 105 and a sixth surface 106 facing each other in the thickness direction T. Each of the first to fourth surfaces 101, 102, 103, and 104 of the body 100 is a wall surface of the body 100 that connects the fifth surface 105 and the sixth surface 106 of the body 100. Hereinafter, both end surfaces (one end surface and the other end surface) of the body 100 may refer to the first surface 101 and the second surface 102 of the body 100, and both side surfaces (one side surface and the other side surface) of the body 100 may refer to the third surface 103 and the fourth surface 104 of the body 100. Also, one surface and the other surface of the body 100 may refer to the sixth surface 106 and the fifth surface 105 of the body 100, respectively. The sixth surface 106 of the body 100 may be used as a mounting surface when the coil component 1000 according to the present exemplary embodiment is mounted on a mounting board such as a printed circuit board (PCB) or the like.

By way of example, the body 100 may be formed such that the coil component 1000 according to the present exemplary embodiment including external electrodes 400 and 500 and the surface insulating layer 600 to be described later has a length of 1.0 mm, a width of 0.5 mm, and a thickness of 0.8 mm or has a length of 0.8 mm, a width of 0.4 mm, and a thickness of 0.8 mm but is not limited thereto. Meanwhile, the aforementioned dimensions are merely design values that do not reflect process errors, etc., and thus, it should be appreciated that dimensions within a range admitted as a process error fall within the scope of the present disclosure.

Based on an optical microscope or a scanning electron microscope (SEM) image for a length directional (L)-thickness directional (T) cross-section at a width-directional (W) central portion of the coil component 1000, the length of the coil component 1000 may refer to a maximum value among lengths of a plurality of segments parallel to the length direction L when outermost boundary lines of the coil component 1000 illustrated in the image of the cross-section are connected. Alternatively, the length of the coil component 1000 may refer to a minimum value among lengths of a plurality of segments parallel to the length direction L when outermost boundary lines of the coil component 1000 illustrated in the image of the cross-section are connected. Alternatively, the length of the coil component 1000 described above may refer to an arithmetic mean value of the lengths of at least two of the plurality of segments parallel to the length direction L when the outermost boundary lines of the coil component 1000 illustrated in the cross-sectional image are connected.

Based on the optical microscope or SEM image for the length directional (L)-thickness directional (T) cross-section at the width-directional (W) central portion of the coil component 1000, the thickness of the coil component 1000 may refer to a maximum value among lengths of a plurality of segments parallel to the thickness direction T when outermost boundary lines of the coil component 1000 illustrated in the image of the cross-section are connected. Alternatively, the thickness of the coil component 1000 may refer to a minimum value among lengths of a plurality of segments parallel to the thickness direction T when outermost boundary lines of the coil component 1000 illustrated in the image of the cross-section are connected. Alternatively, the thickness of the coil component 1000 described above may refer to an arithmetic mean value of the lengths of at least two of the plurality of segments parallel to the thickness direction T when the outermost boundary lines of the coil component 1000 illustrated in the cross-sectional image are connected.

Based on an optical microscope or SEM image for a length directional (L)-width directional (W) cross-section at a thickness-directional (T)-central portion of the coil component 1000, the width of the coil component 1000 may refer to a maximum value among lengths of a plurality of segments parallel to the width direction W when outermost boundary lines of the coil component 1000 illustrated in the image of the cross-section are connected. Alternatively, the width of the coil component 1000 may refer to a minimum value among lengths of a plurality of segments parallel to the width direction W when outermost boundary lines of the coil component 1000 illustrated in the image of the cross-section are connected. Alternatively, the width of the coil component 1000 described above may refer to an arithmetic mean value of the lengths of at least two of the plurality of segments parallel to the width direction W when the outermost boundary lines of the coil component 1000 illustrated in the cross-sectional image are connected.

Alternatively, each of the length, width, and thickness of the coil component 1000 may be measured by a micrometer measurement method. With the micrometer measurement method, each of the length, width, and thickness of the coil component 1000 may be measured by setting a zero point with a gage repeatability and reproducibility (R&R) micrometer, inserting the coil component 1000 according to the present exemplary embodiment into a tip of the micrometer, and turning a measurement lever of the micrometer. In measuring the length of the coil component 1000 by the micrometer measurement method, the length of the coil component 1000 may refer to a value measured once or an arithmetic mean of values measured multiple times. This may equally be applied to the width and thickness of the coil component 1000.

The body 100 may include an insulating resin and a magnetic material. Specifically, the body 100 may be formed by laminating one or more magnetic composite sheets in which a magnetic material is dispersed in an insulating resin. The magnetic material may be ferrite or magnetic metal powder particles.

Ferrite may be at least one of, for example, spinel type ferrite such as Mg—Zn-based ferrite, Mn—Zn-based ferrite, Mn—Mg-based ferrite, Cu—Zn-based ferrite, Mg—Mn—Sr-based ferrite, or Ni—Zn-based ferrite, hexagonal ferrites such as Ba—Zn-based ferrite, Ba—Mg-based ferrite, Ba—Ni-based ferrite, Ba—Co-based ferrite, or Ba—Ni—Co-based ferrite, garnet type ferrite such as Y-based ferrite, and Li-based ferrite.

Magnetic metal powder particles may include at least any one selected from the group consisting of iron (Fe), silicon (Si), chromium (Cr), cobalt (Co), molybdenum (Mo), aluminum (Al), niobium (Nb), copper (Cu) and nickel (Ni). For example, the magnetic metal powder particles may be at least one of pure iron powder particles, Fe—Si-based alloy powder particles, Fe—Si—Al-based alloy powder particles, Fe—Ni-based alloy powder particles, Fe—Ni—Mo-based alloy powder particles, Fe—Ni—Mo—Cu-based alloy powder particles, Fe—Co-based alloy powder particles, Fe—Ni—Co-based alloy powder particles, Fe—Cr-based alloy powder particles, Fe—Cr—Si alloy powder particles, Fe—Si—Cu—Nb-based alloy powder particles, Fe—Ni—Cr-based alloy powder particles, and Fe—Cr—Al-based alloy powder particles.

The magnetic metal powder particles may be amorphous or crystalline. For example, the magnetic metal powder particles may be Fe—Si—B—Cr-based amorphous alloy powder particles, but is not limited thereto.

Ferrite and the magnetic metal powder particles may have an average diameter of about 0.1 μm to 30 μm, but is not limited thereto.

The body 100 may include two or more types of magnetic materials dispersed in a resin. Here, the different types of magnetic materials refer to that magnetic materials dispersed in a resin are distinguished from each other by any one of an average diameter, a composition, crystallinity, and a shape.

Meanwhile, hereinafter, it is assumed that the magnetic material is magnetic metal powder particles, but the scope of the present disclosure is not limited only to the body 100 having a structure in which the magnetic metal powder particles are dispersed in the insulating resin.

The insulating resin may include, but is not limited to, epoxy, polyimide, liquid crystal polymer, or the like alone or in combination.

The body 100 includes a core 110 penetrating a central portion of each of the support substrate 200 and the coil unit 300 to be described later. The core 110 may be formed by filling a through hole penetrating the central portion of each of the coil unit 300 and the support substrate 200 by the magnetic composite sheet, but is not limited thereto.

The support substrate 200 is disposed in the body 100. The support substrate 200 is configured to support the coil unit 300 to be described later.

The support substrate 200 may be formed of an insulating material including a thermosetting insulating resin such as an epoxy resin, a thermoplastic insulating resin such as polyimide, or a photosensitive insulating resin or may be formed of an insulating material prepared by impregnating a reinforcing material such as glass fiber or inorganic filler in this insulating resin. As an example, the support substrate 200 may be formed of insulating materials such as prepreg, Ajinomoto build-up film (ABF), FR-4, a bismaleimide triazine (BT) resin, photo imageable dielectric (PID), a copper clad laminate (CCL) etc., but is not limited thereto.

As an inorganic filler, at least one selected from the group consisting of silica ($SiO_2$), alumina ($Al_2O_3$), silicon carbide (SiC), barium sulfate ($BaSO_4$), talc, mud, mica powder particles, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$) may be used.

When the support substrate 200 is formed of an insulating material including a reinforcing material, the support substrate 200 may provide more excellent rigidity. If the support substrate 200 is formed of an insulating material that does not contain glass fibers, the support substrate 200 is advantageous in reducing the width of the component by reducing the thickness of the entirety of the coil unit 300 (which refers to the sum of lengths of the coil unit and the support substrate according to the width direction W of FIG. 1). When the support substrate 200 is formed of an insulating material including a photosensitive insulating resin, the number of processes for forming the coil unit 300 may be reduced, which is advantageous in reducing production cost and forming fine vias.

The coil unit 300 is disposed on the support substrate 200. The coil unit 300 is embedded in the body 100 and manifests the characteristics of the coil component 1000. For example, when the coil component 1000 of the present exemplary embodiment is used as a power inductor, the coil unit 300 may serve to stabilize power of an electronic device by storing an electric field as a magnetic field and maintaining an output voltage.

The coil unit 300 is disposed on the support substrate 200 perpendicularly to the sixth surface 106 of the body 100. The coil unit 300 is formed on at least one of both surfaces of the support substrate 200 facing each other in the width direction W, and forms at least one turn. The coil unit 300 is disposed on one surface and the other surface of the support substrate 200 facing each other in the width direction W of the body 100 and is disposed to be perpendicularly to the sixth surface 106 of the body 100. In this exemplary embodiment, the coil unit 300 includes coil patterns 311 and 312, vias 320, and lead patterns 331 and 332.

Each of the first coil pattern 311 and the second coil pattern 312 may be in the form of a flat spiral in which at least one turn is formed around the core 110 of the body 100. For example, based on the direction of FIG. 1, the first coil pattern 311 may form at least one turn around the core 110 on the front surface of the support substrate 200. The second coil pattern 312 forms at least one turn around the core 110 on the rear surface of the support substrate 200. Ends of the innermost turns of each of the first and second coil patterns 311 and 312 are connected to each other by a via 320 penetrating the support substrate 200. Ends of the outermost turns of each of the first and second coil patterns 311 and 312 connected to the lead patterns 331 and 332 extend to the sixth surface 106 of the body 100 with respect to a central portion of the body 100 in the thickness direction T. As a result, the first and second coil patterns 311 and 322 may increase the number of turns of the entire coil unit 300 compared to a case where the ends of the outermost turns of the coil are formed only up to the central portion of the body in the thickness direction.

Based on the direction of FIG. 1, the first lead pattern 331 extends from the outermost turn of the first coil pattern 311 on the front surface of the support substrate 200 and is exposed to an inner surface of a first recessed-cutout portion S1 to be described later. Based on the direction of FIG. 1, the second lead pattern 332 extends from the outermost turn of the second coil pattern 312 on the rear surface of the support substrate 200 and is exposed to an inner surface of a second recessed-cutout portion S2 to be described later. The first and second lead patterns 331 and 332 exposed to the inner surfaces of the first and second recessed-cutout portions S1 and S2 are in contact with and connected to first and second external electrodes 400 and 500 to be described later, respectively. The lead patterns 331 and 332 may be formed with through portions penetrating the lead patterns 331 and 332. In this case, since at least a part of the body 100 is disposed in the through portions, the coupling force between the body 100 and the coil unit 300 may be improved (anchoring effect). Further, the through portion may extend to penetrate not only the lead patterns 331 and 332 but also the support substrate 200, but the scope of the present disclosure is not limited thereto.

At least one of the coil patterns 311 and 312, the via 320, and the lead patterns 331 and 332 may include at least one conductive layer.

As an example, when the first coil pattern 311, the via 320, and the first lead pattern 331 are formed by plating on the front surface of the support substrate 200 (based on the direction of FIG. 1), each of the first coil pattern 311, the via 320, and the first lead pattern 331 may include a seed layer and an electroplating layer. The seed layer may be formed by an electroless plating method or a vapor deposition method such as sputtering. Each of the seed layer and the electroplating layer may have a single layer structure or a multilayer structure. The multilayer electroplating layer may be formed in a conformal film structure in which one electroplating layer is covered by the other electroplating layer, or the other electroplating layer is stacked on only one surface of any one electroplating layer. The seed layers of the first coil pattern 311, the via 320, and the first lead pattern 331 may be integrally formed so that a boundary may not be formed therebetween, but is not limited thereto. The electroplating layers of each of the first coil pattern 311, the via 320, and the first lead pattern 331 may be integrally formed so that a boundary may not be formed therebetween, but is not limited thereto.

Each of the coil patterns 311 and 312, the via 320, and the lead patterns 331 and 332 may include a conductive material such as copper (Cu), aluminum (Al), silver (Ag), tin (Sn), gold (Au), nickel (Ni), lead (Pb), titanium (Ti), chromium (Cr), molybdenum (Mo), or an alloy thereof, but is not limited thereto.

In the case of this exemplary embodiment, since the coil unit 300 is disposed perpendicularly to the sixth surface 106 of the body 100, which is a mounting surface, a mounting area may be reduced, while the volume of the body 100 and the coil unit 300 is maintained. Therefore, a larger number of electronic components may be mounted on a mounting board having the same area. In addition, in the case of the present exemplary embodiment, since the coil unit 300 is disposed perpendicularly to the sixth surface 106 of the body 100 as the mounting surface, a direction of a magnetic flux induced to the core 110 by the coil unit 300 is parallel to the sixth surface 106 of the body 100. As a result, noise induced to the mounting surface of the mounting board may be relatively reduced. Meanwhile, in the present disclosure, that the coil unit 300 is disposed perpendicularly to the sixth surface 106 of the body 100 means that a central axis of the core 110 disposed at the central portion of the coil unit 300 and the sixth surface 106 of the body 100 form an angle in the range of approximately 160° to 200°.

The recessed-cutout portions S1 and S2 are formed to be spaced apart from each other in the length direction L on the sixth surface 106 of the body 100 and allow the first and second lead patterns 331 and 332 to be exposed to inner surfaces thereof. Specifically, the first recessed-cutout portion S1 is formed on the sixth surface 106 of the body 100 and allows the first lead pattern 331 to be exposed to the inner surface thereof. The second recessed-cutout portion S2 is formed to be spaced apart from the first recessed-cutout portion S1 on the sixth surface 106 of the body 100 and allows the second lead pattern 332 to be exposed to the inner surface thereof. The recessed-cutout portions S1 and S2 may be formed by dicing a coil bar in which a plurality of bodies are connected to individualize bodies of a plurality of components and performing slit dicing or wire sawing on the six surface 106 of the body 100. The recessed-cutout portions S1 and S2 may be formed in the body 100 before a process of forming the external electrodes 400 and 500, which will be described later, so that conductive resin layers 410 and 510 of the external electrodes 400 and 500 to be described later may be disposed in the recessed-cutout portions S1 and S2.

The recessed-cutout portions S1 and S2 may extend to corner portions between each of the third and fourth surfaces 103 and 104 of the body 100 and the sixth surface 106 of the body 100 on the six surface 106 of the body 100. Also, the recessed-cutout portions S1 and S2 may extend to corner portions between each of the first and second surfaces 101 and 102 of the body 100 and the sixth surface 106 of the body 100 on the six surface 106 of the body 100. Specifically, on the sixth surface 106 of the body 100, the first recessed-cutout portion S1 may extend from the corner portion between the sixth surface 106 of the body 100 and the third surface 103 of the body 100 to the corner portion between the sixth surface 106 of the body 100 and the fourth surface 104 of the body 100 and extend to the corner portion between the sixth surface 106 of the body 100 and the first surface 101 of the body 100. On the sixth surface 106 of the body 100, the second recessed-cutout portion S2 extends from the corner portion between the sixth surface 106 of the body 100 and the third surface 103 of the body 100 to the corner portion between the sixth surface 106 of the body 100 and the fourth surface 104 of the body 100. That is, each of the recessed-cutout portions S1 and S2 is formed on the entirety of the body 100 in the width direction W on the sixth surface 106 of the body 100. Also, one of both ends of each of the recessed-cutout portions S1 and S2 facing each other in the length direction L extends to the first and second surfaces 101 and 102 of the body 100 facing each other in the length direction L. The recessed-cutout portions S1 and S2 are filled with conductive resin layers 410 and 510 of the external electrodes 400 and 500 to be described later, and since each of the recessed-cutout portions S1 and S2 extends to three out of four surfaces connected to the sixth surface 106 of the body 100 on the sixth surface 106 of the body 100, a volume of the recessed-cutout portions S1 and S2 that may be filled with the conductive resin layers 410 and 510 may increase. The conductive resin layers 410 and 510 include base resins 411 and 511 to be described later, and since the base resins 411 and 511 are the same polymeric material as the insulating resin included in the body 100, a contact area between the body 100 and the conductive layers 410 and 510 including the homogeneous material may increase, and thus bonding force therebetween may increase. Furthermore, bonding force between the external electrodes 400 and 500 and the body 100 increases.

The external electrodes 400 and 500 are disposed spaced apart from each other on the sixth surface 106 of the body and are connected to the first and second lead patterns 331 and 332 of the coil unit 300, respectively. The external electrodes 400 and 500 include the conductive resin layers 410 and 510 filling the recessed-cutout portions S1 and S2 to be in contact with the lead patterns 331 and 332 exposed to the recessed-cutout portions S1 and S2 and having one surface exposed to the sixth surface 106 of the body 100 and electrode layers 420 and 520 disposed on one surface of the conductive resin layers 410 and 510. Specifically, the first external electrode 400 includes the first conductive resin layer 410 filling the first recessed-cutout portion S1 to be in contact with the first lead pattern 331 exposed to the first recessed-cutout portion S1 and having one surface exposed to the sixth surface 106 of the body 100 and the first electrode layer 420 disposed on one surface of the first conductive resin layer 410. The second external electrode 500 includes the second conductive resin layer 510 filling the second recessed-cutout portion S2 to be in contact with the second lead pattern 332 exposed to the second recessed-cutout portion S2 and having one surface exposed to the sixth surface 106 of the body 100 and the second electrode layer 520 disposed on one surface of the second conductive resin layer 510.

The external electrodes 400 and 500 electrically connect the coil component 1000 according to the present exemplary embodiment to a printed circuit board (PCB) or the like when the coil component 1000 is mounted on the PCB or the like. As an example, the coil component 1000 according to the present exemplary embodiment may be mounted so that the sixth surface 106 of the body 100 faces an upper surface of the PCB, and the external electrodes 400 and 500 spaced apart from each other on the sixth surface of the body 100 and a connection portion of the PCB may be electrically connected to each other.

The external electrodes 400 and 500 may be formed of copper (Cu), aluminum (Al), silver (Ag), tin (Sn), gold (Au), nickel (Ni), lead (Pb), chromium (Cr), titanium (Ti), or an alloy thereof, but are not limited thereto.

An intermetallic compound (IMC) is disposed on the exposed surfaces of each of the first and second lead patterns 331 and 332 exposed to the first and second recessed-cutout portions S1 and S2 and is in contact with the conductive connection portion 412. Meanwhile, in the following description of the external electrodes 400 and 500 and the intermetallic compound (IMC), the first external electrode 400 is mainly described, but the description of the first external electrode 400 may also be applied to the second external electrode 500 equally.

The first conductive resin layer 410 includes the base resin 411 and the conductive connection portion 412 disposed in the base resin 411 and connecting the first lead pattern 331 exposed to the first recessed-cutout portion S1 to the first electrode layer 420. The first conductive resin layer 410 may be formed by filling the first recessed-cutout portion S1 with a conductive paste in which a plurality of metal particles are dispersed in the base resin 411 and drying and curing the conductive paste. Meanwhile, the plurality of metal particles in the conductive paste may be at least partially melted and then cooled by heat and pressure during a drying and curing process, thereby forming the conductive connection portion 412 of the conductive resin layer 410. Specifically, the conductive paste may include metal powder particles containing a low melting point metal having a melting point lower than a curing temperature of the base resin 411 and metal powder particles containing a high melting point metal having a melting point higher than the melting point of the low melting point metal particles. When the paste is cured, the metal powder particles of the low melting point metal is melted and reacts with the metal powder particles of the high melting point metal to form the conductive connection portion 412. Meanwhile, FIG. 5 shows that the metal powder particles of the low melting point metal and the metal powder particles of the high melting point metal in the paste described above entirety react when cured, so that the metal powder particles are not present in the conductive resin layer 410, but this is an example. As another example, at least a part of the metal powder particles of the high melting point metal in the paste may remain in the conductive connection portion 412 of the conductive resin layer 410. Metal particles remaining in the conductive resin layer 410 may include at least one of nickel (Ni), silver (Ag), silver-coated copper (Cu), tin (Sn)-coated copper (Cu), and copper (Cu). The metal particles may be formed in one of a spherical shape or a flake shape.

The conductive connection portion 412 may be formed as the metal powder particles including the low melting point metal described above is melted and then cooled in the process of drying and curing the conductive paste. Thus, the low melting point metal included in the conductive connection portion 412 may have a melting point lower than a curing temperature of the base resin 411. The low melting point metal included in the conductive connection portion 412 may preferably have a melting point of 300° C. É or less.

The metal included in the conductive connection portion 412 may be formed of an alloy of two or more selected from tin (Sn), lead (Pb), indium (In), copper (Cu), silver (Ag), and bismuth (Bi). When the aforementioned conductive paste includes silver (Ag) and tin (Sn) powder particles, the conductive connection portion 412 may include $Ag_3Sn$. In this case, the first lead pattern 331 may include copper (Cu), and the intermetallic compound (IMC) disposed between the conductive connection portion 412 and the first lead pattern 331 may include Cu—Sn.

The intermetallic compound (IMC) is disposed between the exposed surface of the first lead pattern 331 exposed to the first recessed-cutout portion S1 and the first conductive resin layer 410 and is in contact with and connected to the conductive connection portion 412. The intermetallic compound (IMC) improves electrical and mechanical bonding between the first conductive resin layer 410 and the first lead pattern 331 to reduce contact resistance between the first conductive resin layer 410 and the first lead pattern 331.

The intermetallic compound (IMC) may be formed by reacting a metal powder particles including the low melting point metal described above with a metal constituting the first lead pattern 331 during the process of drying and curing the paste. Specifically, when the metal powder particles containing the low melting point metal includes tin (Sn) and the first lead pattern 331 includes copper (Cu), the intermetallic compound (IMC) may include copper-tin (Cu—Sn). However, this is only an example and the intermetallic compound (IMC) may be formed of one of silver-tin (Ag—Sn) and nickel-tin (Ni—Sn).

A plurality of IMCs may be arranged between the first conductive resin layer 410 and the exposed surface of the first lead pattern 331 and spaced apart from each other. That is, the IMCs may be arranged in the form of a plurality of islands spaced apart from each other on the exposed surface of the first lead pattern 331, and each of the plurality of IMCs and the conductive connection portion 412 of the first conductive resin layer 410 may be in contact with each other.

The base resin 411 may include a thermosetting resin having electrical insulation properties. The thermosetting resin may be, for example, an epoxy resin, and the present disclosure is not limited thereto. The thermosetting resin included in the base resin 411 may be the same as the thermosetting resin included in the body 100. In this case, a mechanical bonding force between the first conductive resin layer 410 and the body 100 may be improved.

The first electrode layer 420 may include at least one plating layer. That is, each of the external electrodes 400 and 500 may be formed in a multilayer structure. Specifically, the first external electrode 400 may include a first sub-layer in contact with the first conductive resin layer and including nickel (Ni) and a second sub-layer disposed on the first sub-layer and including tin (Sn), as the first electrode layer 420. The first electrode layer 420 may be an electroplating layer formed with the first conductive resin layer 410 as a seed layer, but the scope of the present disclosure is not limited thereto.

The surface insulating layer 600 is disposed in a region of the sixth surface 106 of the body 100, excluding a region in which the external electrodes 400 and 500 are formed. The surface insulating layer 600 is also disposed on at least a part of each of the first to fifth surfaces 101, 102, 103, 104 and 105 of the body 100. In this exemplary embodiment, the surface insulating layer 600 is disposed to cover each of the first to fifth surfaces 101, 102, 103, 104 and 105 of the body 100 and is disposed in the region of the sixth surface 106 of the body 100 described above.

The surface insulating layer 600, for example, may be formed by applying and curing an insulating material including an insulating resin on the body 100, may be formed by laminating and curing an insulating film including an insulating resin, or may be formed by spray-coating a liquid insulating material including an insulating resin. In this case, the surface insulating layer 600 may include at least one of a thermoplastic resin such as polystyrene, vinyl acetate, polyester, polyethylene, polypropylene, polyamide, rubber, acryl-based resin, a thermosetting resin such as phenol, epoxy, urethane, melamine, and alkyd-based resin, and a photosensitive insulating resin. As another example, the surface insulating layer 600 may be formed by forming an insulating material on the body 100 by vapor deposition such as chemical vapor deposition (CVD).

The coil component 1000 according to the present exemplary embodiment may further include an insulating film IF formed on the surface of the support substrate 200 and the coil unit 300. The insulating film IF, which serves to insulate the coil unit 300 from the body 100, may include a known insulating material such as parylene, but is not limited thereto. The insulating film IF may be formed by a method such as vapor deposition, but is not limited thereto, and may be formed by laminating an insulating film on both surfaces of the support substrate 200.

In the coil component 1000 according to the present exemplary embodiment, since the conductive resin layers 410 and 420 having relatively excellent bonding strength with the body 100 are disposed in the recessed-cutout portions S1 and S2 formed on the body 100, a bonding force between the body 100 and the conductive resin layers 410 and 420 is improved. Accordingly, the bonding force between the body 100 and the coil unit 300 and the bonding force between the coil unit 300 and the external electrodes 400 and 500 are also improved.

Figure 6:
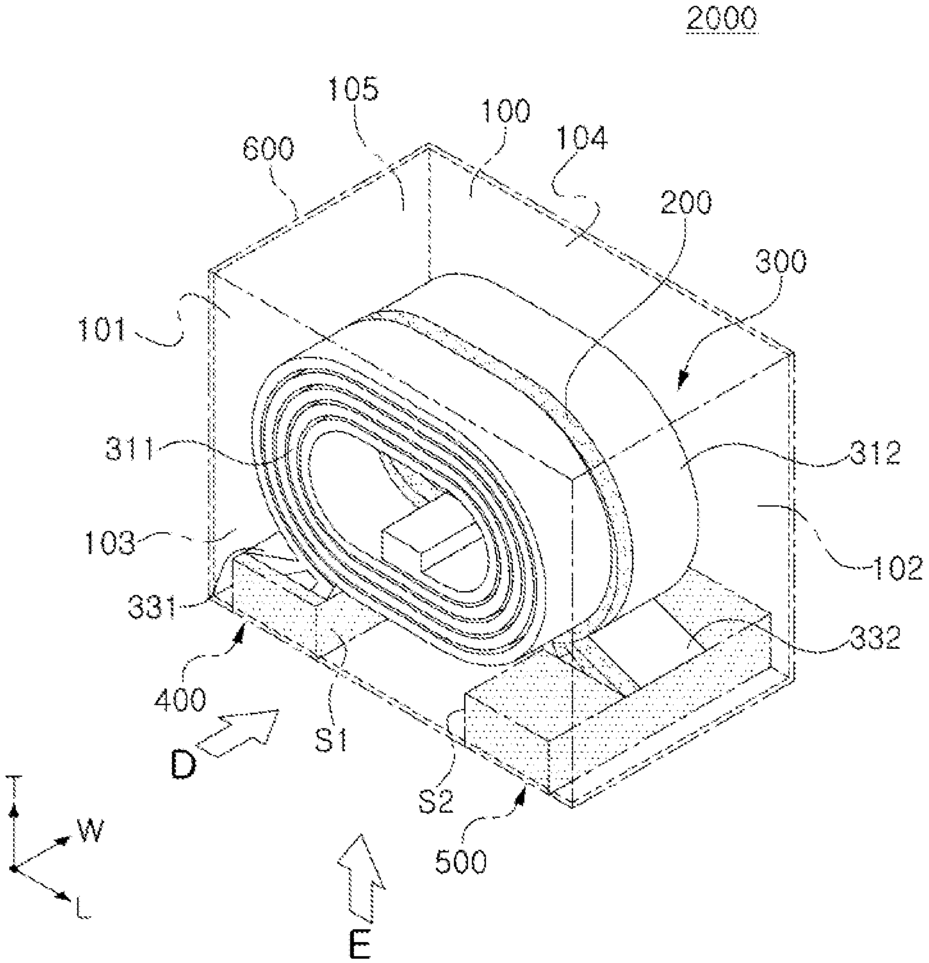
FIG. 6 is a view schematically illustrating a coil component according to another exemplary embodiment in the present disclosure.
Figure 7:
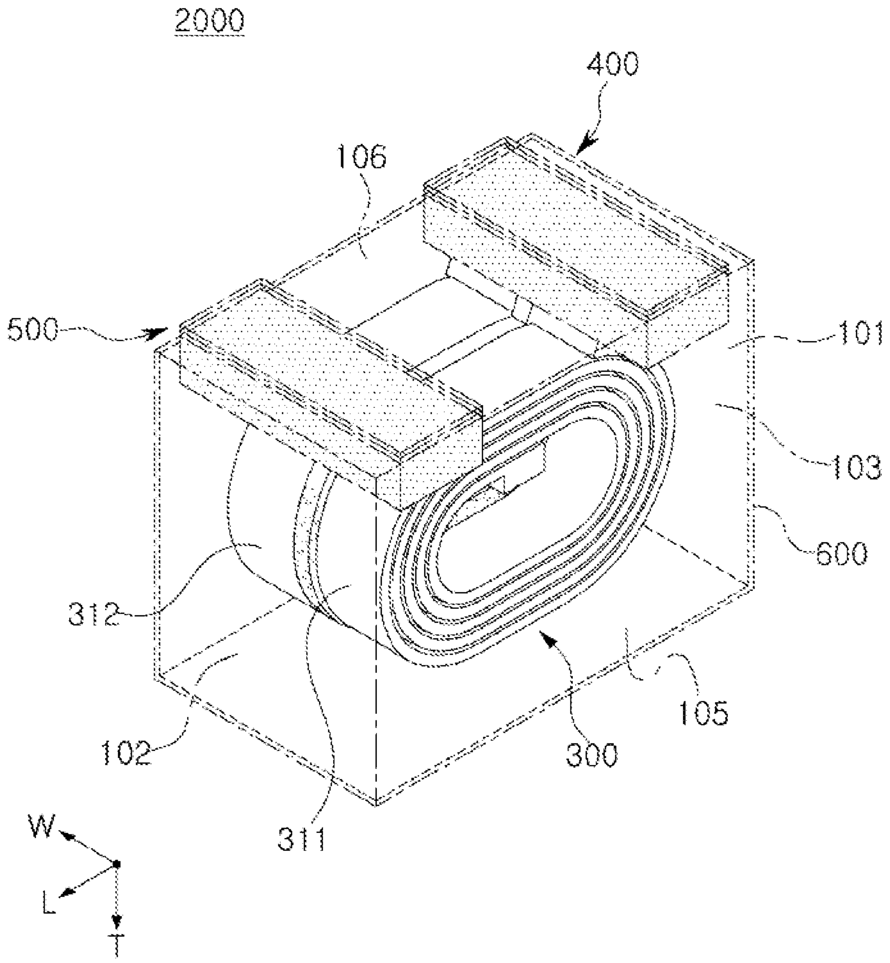
FIG. 7 is a bottom view schematically illustrating a coil component according to another exemplary embodiment in the present disclosure.
Figure 8:
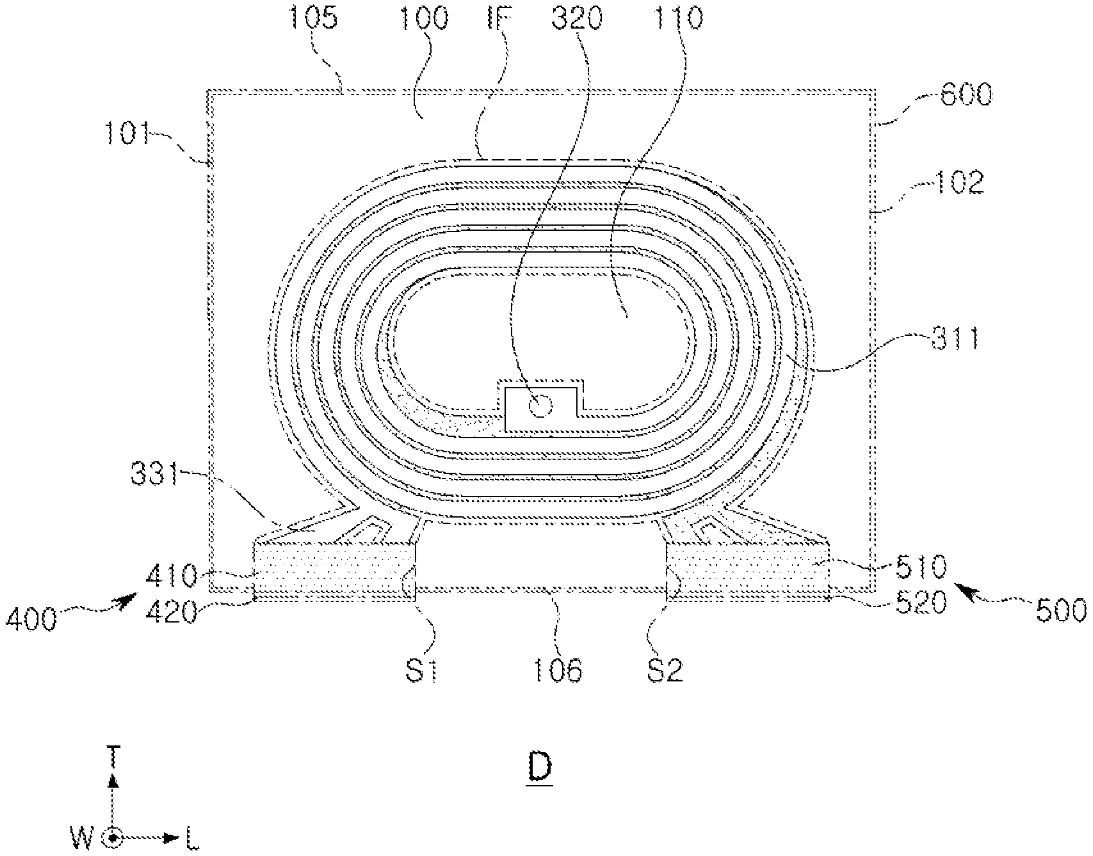
FIG. 8 is a view schematically illustrating a coil component viewed in a direction D of FIG. 6.
Figure 9:
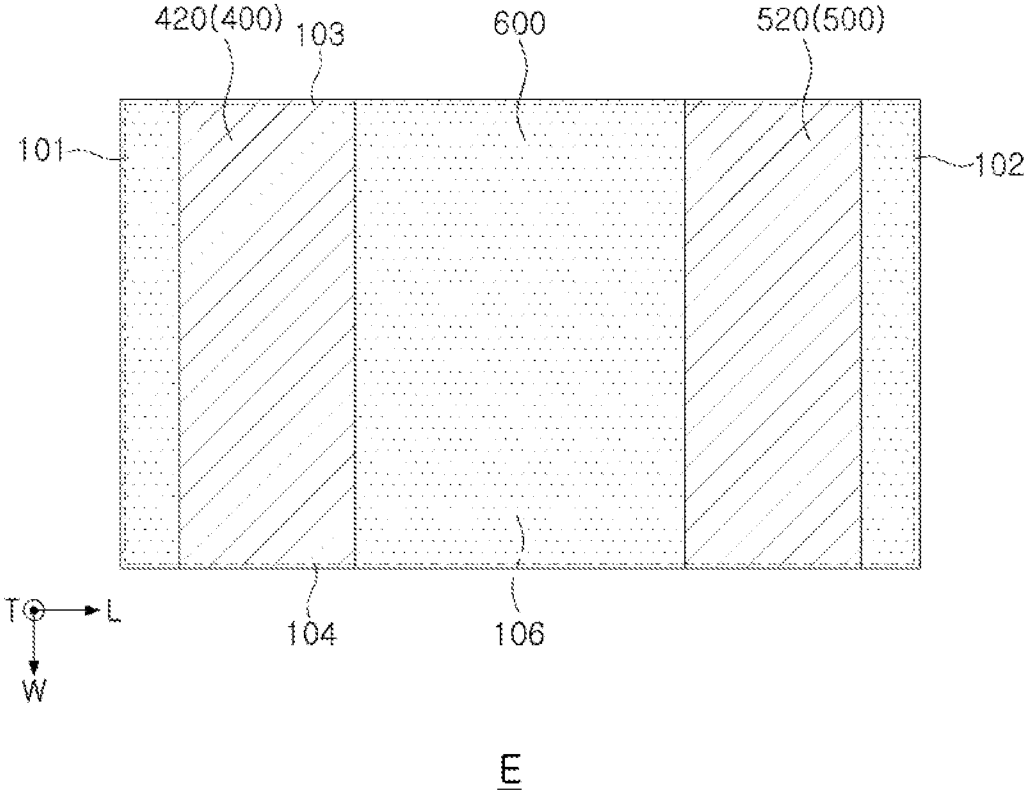
FIG. 9 is a view schematically illustrating an example of a coil component viewed in a direction E of FIG. 6.

FIG. 6 is a view schematically illustrating a coil component according to another exemplary embodiment in the present disclosure. FIG. 7 is a bottom view schematically illustrating a coil component according to another exemplary embodiment in the present disclosure. FIG. 8 is a view schematically illustrating a coil component viewed in a direction D of FIG. 6. FIG. 9 is a view schematically illustrating an example of a coil component viewed in a direction E of FIG. 6.

Meanwhile, FIG. 8 shows a coil component viewed in the direction D of FIG. 6, illustrating a projected internal structure of the coil component according to an exemplary embodiment of the present disclosure.

When comparing FIGS. 1 through 5 and FIGS. 6 through 9, a coil component 2000 according to this exemplary embodiment includes recessed-cutout portions S1 and S2 different from those of the coil component 1000 according to an exemplary embodiment in the present disclosure. Therefore, in describing the present exemplary embodiment, only the recessed-cutout portions S1 and S2 different from those of the coil component 1000 according to an exemplary embodiment in the present disclosure will be described. For the rest of the components of this exemplary embodiment, the description in the exemplary embodiment in the present disclosure may be applied as it is.

Referring to FIGS. 6 through 9, in the case of this exemplary embodiment, the recessed-cutout portions S1 and S2 are formed to extend to a corner portion between each of the third and fourth surfaces 103 and 104 of the body 100 and the sixth surface 106 of the body 100 and is spaced apart from the corner portion between each of the first and second surfaces 101 and 102 of the body and the sixth surface 106 of the body 100 on the sixth surface 106 of the body 100. That is, the first recessed-cutout portion S1 extends from the corner portion between the sixth surface 106 of the body 100 and the third surface 103 of the body 100 to the corner portion between the sixth surface 106 of the body and the fourth surface 104 of the body 100 but is spaced apart from the corner portion between the sixth surface 106 of the body 100 and the first surface 101 of the body 100 on the sixth surface 106 of the body 100. The second recessed-cutout portion S2 extends from the corner portion between the sixth surface 106 of the body 100 and the third surface 103 of the body 100 to the corner portion between the sixth surface 106 of the body and the fourth surface 104 of the body 100 but is spaced apart from the corner portion between the sixth surface 106 of the body 100 and the second surface 102 of the body 100 on the sixth surface 106 of the body 100. Accordingly, each of the conductive resin layers 410 and 420 disposed in the recessed-cutout portions S1 and S2 is formed to be spaced apart from the corner between each of the first and second surfaces 101 and 102 of the body 100 and the sixth surface of the body 100. Meanwhile, based on the direction of FIG. 9, a surface insulating layer 600 is disposed on a left region of the first external electrode 400 in the sixth surface 106 of the body 100 and on a right region of the second external electrode 500 in the sixth surface 106 of the body 100. Therefore, in the case of the present exemplary embodiment, the coil component 2000 according to the present exemplary embodiment is prevented from being electrically short-circuited with other components mounted outside the length direction L, while the bonding force between the body 100 and the conductive resin layers 410 and 420 is improved.

Figure 10:
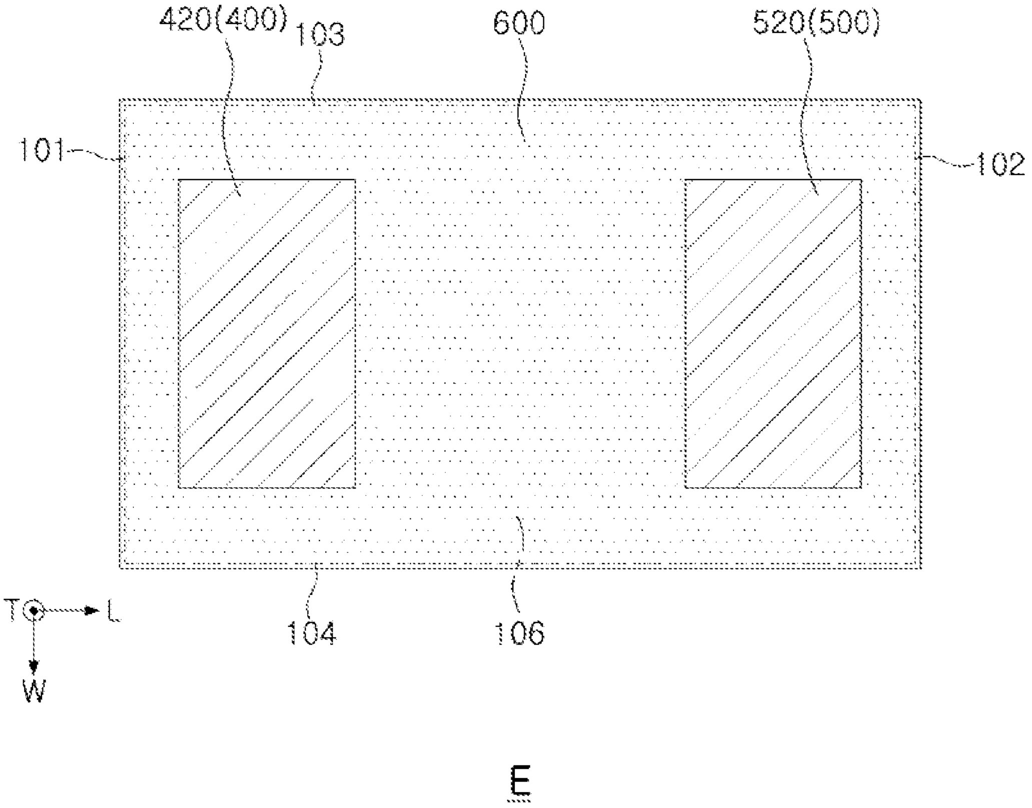
FIG. 10 is a view schematically illustrating another example of a coil component viewed in the direction E of FIG. 6.

FIG. 10 is a view schematically illustrating another example of a coil component viewed in the direction E of FIG. 6.

Referring to FIG. 10, in the case of this modification, recessed-cutout portions S1 and S2 are formed to be spaced apart from a corner portion between each of the first to fourth surfaces 101, 102, 103, and 104 of the body 100 and the sixth surface 106 of the body 100 on the sixth surface 106 of the body 100. That is, the first recessed-cutout portion S1 is formed to be spaced apart from the corner portion between each of the first, third, and fourth surfaces 101, 103, and 104 of the body 100 and the sixth surface 106 of the body 100 on the sixth surface 106 of the body 100. The second recessed-cutout portion S2 is formed to be spaced apart from the first recessed-cutout portion S1 in the length direction L on the sixth surface 106 of the body 100 and is formed to be spaced apart from the corner portion between each of the second to fourth surfaces 102, 103, and 104 of the body 100 and the sixth surface 106 of the body 100 on the sixth surface 106 of the body 100. Accordingly, each of the conductive resin layers 410 and 420 disposed in the recessed-cutout portions S1 and S2 is disposed to be spaced apart from the corner between each of the first to fourth surfaces 101, 102, 103 and 104 of the body 100 and the sixth surface of the body 100. Therefore, in the case of the present modification, it is possible to prevent electrical short-circuiting with other components mounted outside the length direction L and/or the width direction W.

As set forth above, according to exemplary embodiments of the present disclosure, connection reliability between the coil unit and the external electrodes may be improved.

While exemplary embodiments have been shown and described above, it will be apparent to those skilled in the art that modifications and variations could be made without departing from the scope of the present disclosure as defined by the appended claims.

What is claimed is:

1. A coil component comprising:

a body having a first surface and including first and second recess spaced apart from each other on the first surface of the body;

a coil unit embedded in the body and disposed to be perpendicularly to the first surface of the body;

first and second external electrodes disposed to be spaced apart from each other on the first surface of the body and connected to first and second lead patterns of the coil unit, respectively, wherein the first and second external electrodes include conductive resin layers respectively disposed on the first and second recess to be in contact with the first and second lead patterns exposed to the first and second recess, and the first and second external electrodes further include electrode layers disposed on first surfaces of the conductive resin layers, respectively.

2. The coil component of claim 1, wherein the body further includes a first end surface and a second end surface connected to the first surface of the body and opposing each other in a length direction, and a first side surface and a second side surface connecting the first end surface and the second end surface and opposing each other, and the first and second recess are spaced apart from each other in the length direction on the first surface of the body.

3. The coil component of claim 2, wherein each of the first and second recess extends from the first surface of the body to a corner portion between each of the first side surface and the second side surface of the body and the first surface of the body.

4. The coil component of claim 3, wherein the first recess is spaced apart from a corner portion between the first end surface of the body and the first surface of the body on the first surface of the body, and the second recess is spaced apart from a corner portion between the second end surface of the body and the first surface of the body on the first surface of the body.

5. The coil component of claim 2, wherein each of the first and second recess is spaced apart from a corner portion between each of the first side surface, the second side surface, the first end surface, and the second end surface of the body and the first surface of the body on the first surface of the body.

6. The coil component of claim 1, wherein

Each of the conductive resin layers includes a base resin and a conductive connection portion disposed in the base resin and connecting the first and second lead patterns exposed to the first and second recess to the electrode layers, respectively.

7. The coil component of claim 6, further comprising an intermetallic compound (IMC) disposed on an exposed surface of each of the first and second lead patterns exposed to the first and second recess, the IMC being in contact with the conductive connection portion.

8. The coil component of claim 7, wherein the IMC is provided in plurality, spaced apart from one another on the exposed surface of each of the first and second lead patterns.

9. The coil component of claim 7, wherein the IMC includes one of copper-tin, silver-tin, or nickel-tin.

10. The coil component of claim 1, further comprising a surface insulating layer disposed in a region excluding a region of the first surface of the body in which the first and second external electrodes are disposed.

11. The coil component of claim 10, wherein the body further includes a second surface opposing the first surface of the body, a first end surface and a second end surface connecting the first surface and the second surface of the body and opposing each other, and a first side surface and a second side surface connecting the first end surface and the second end surface and opposing each other, and the surface insulating layer is further disposed at least a part of each of the second surface, the first side surface, the second side surface, the first end surface, and the second end surface of the body.

12. The coil component of claim 1, further comprising a support member disposed in the body;

wherein the coil unit is disposed on the support member.

13. A coil component comprising:

a body having a first surface and including first and second recess spaced apart from each other on the first surface of the body;

a coil unit disposed in the body and perpendicularly to the first surface of the body and including first and second lead patterns exposed to inner surfaces of the first and second recess, respectively; and first and second external electrodes spaced apart from each other on the first surface of the body and connected to the first and second lead patterns, respectively, wherein the first and second external electrodes each includes a conductive resin layer including a base resin and a conductive connection portion disposed in the base resin and connected to the first and second lead patterns respectively exposed to the first and second recess.

14. A coil component comprising:

a body:

a coil unit disposed in the body and perpendicularly to a first surface of the body and including first and second lead patterns;

first and second external electrodes, at least partially embedded in the body, spaced apart from each other on the first surface of the body, wherein each of the first and second external electrodes includes a conductive resin layer partially embedded in the body to be connected to the first or second lead pattern, and further includes an electrode layer disposed on a first surface of the conductive resin layer exposed from the first surface of the body.

15. The coil component of claim 14, wherein the conductive resin layer includes a base resin and a conductive connection portion disposed in the base resin and connected to the first or second lead pattern.

16. The coil component of claim 15, further comprising an intermetallic compound (IMC) disposed on an exposed surface of each of the first and second lead patterns, the IMC being in contact with the conductive connection portion.

17. The coil component of claim 16, wherein the IMC is provided in plurality, spaced apart from one another on the exposed surface of each of the first and second lead patterns.

18. The coil component of claim 14, wherein the body further includes a second surface opposing the first surface of the body, a first end surface and a second end surface connecting the first surface to the second surface of the body and opposing each other, and a first side surface and a second side surface connecting the first end surface to the second end surface and opposing each other.

19. The coil component of claim 18, wherein the first and second external electrodes are spaced apart from the first and second end surfaces of the body, respectively, and the first and second external electrodes extend to be in contact with the first and second side surfaces of the body, respectively.

20. The coil component of claim 18, wherein the first and second external electrodes are spaced apart from the first and second end surfaces of the body, respectively, and the first and second external electrodes are spaced apart from the first and second side surfaces of the body, respectively.

21. The coil component of claim 18, further comprising a surface insulating layer disposed in a region excluding a region of the first surface of the body in which the first and second external electrodes are disposed.

* * * * *